(12) United States Patent
Wood et al.

(10) Patent No.: US 7,194,025 B2
(45) Date of Patent: Mar. 20, 2007

(54) UPDATING ADAPTIVE EQUALIZER COEFFICIENTS USING KNOWN OR PREDICTABLE BIT PATTERNS DISTRIBUTED AMONG UNKNOWN DATA

(75) Inventors: Jerry Busby Wood, Melbourne, FL (US); Lonnie Scott Jaynes, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 407 days.

(21) Appl. No.: 10/462,559

(22) Filed: Jun. 16, 2003

(65) Prior Publication Data

US 2004/0252754 A1    Dec. 16, 2004

(51) Int. Cl.
*H03H 7/30* (2006.01)
(52) U.S. Cl. .................................................. 375/231
(58) Field of Classification Search ................ 375/229, 375/230, 232, 233, 368
See application file for complete search history.

(56) References Cited

U.S. PATENT DOCUMENTS

| | | | | |
|---|---|---|---|---|
| 4,365,338 A | 12/1982 | McRae et al. | ................ | 375/12 |
| 4,555,789 A | 11/1985 | Hogge, Jr. | .................... | 375/11 |
| 4,599,732 A | 7/1986 | LeFever | ........................ | 375/13 |
| 4,969,040 A * | 11/1990 | Gharavi | ................. | 375/240.11 |
| 5,191,462 A | 3/1993 | Gitlin et al. | ................. | 359/189 |
| 5,519,727 A * | 5/1996 | Okanoue et al. | ............. | 375/232 |
| 5,692,010 A * | 11/1997 | Nielsen | ....................... | 375/232 |
| 5,796,814 A * | 8/1998 | Brajal et al. | ................. | 375/232 |
| 5,825,818 A * | 10/1998 | Kaku et al. | .................. | 375/232 |
| 6,016,379 A | 1/2000 | Bulow | ........................ | 385/147 |
| 6,560,278 B2 * | 5/2003 | Kubo et al. | .................. | 375/232 |
| 6,724,837 B1 * | 4/2004 | Zhou | ........................... | 375/343 |
| 2002/0024995 A1 * | 2/2002 | Kim | ............................. | 375/231 |
| 2003/0235259 A1 * | 12/2003 | Xia et al. | ..................... | 375/350 |
| 2004/0213341 A1 * | 10/2004 | Fimoff et al. | ................ | 375/233 |

* cited by examiner

*Primary Examiner*—Kevin Kim
(74) *Attorney, Agent, or Firm*—Allen, Dyer, Doppelt, Milbrath & Gilchrist, P.A.

(57) ABSTRACT

An embedded pattern-based adaptive equalizer coefficient updating mechanism updates weighting coefficients of an adaptive equalizer in accordance with an error or differential signal obtained by processing the distorted version of a known signal pattern, that is repetitively distributed among information signals contained within the electrical communication signal output from the equalizer, with a copy of the known signal pattern. No dedicated 'training sequence' communication with the transmitter is required, so that the coefficient update mechanism does not impact the operation or bandwidth availability of the channel.

9 Claims, 1 Drawing Sheet

UPDATING ADAPTIVE EQUALIZER COEFFICIENTS USING KNOWN OR PREDICTABLE BIT PATTERNS DISTRIBUTED AMONG UNKNOWN DATA

FIELD OF THE INVENTION

The present invention relates in general to communication systems and subsystems therefor, and is particularly directed to a method and apparatus for compensating for dispersive distortion in an optical communication channel, by means of an adaptive equalizer that is installed in an electrical signal processing path of an opto-electronic receiver, wherein the weighting coefficients of the equalizer are updated in accordance with an error or differential signal obtained by processing the distorted version of a known signal pattern, that is repetitively distributed among information signals contained within the electrical communication signal output from the equalizer with a copy of the known signal pattern.

BACKGROUND OF THE INVENTION

A number of communication networks and systems, such as, but not limited to high data rate optical communication systems, employ communication channels that are dispersive—in that they cause the energy of a respective signal component to be dispersed or spread in time as it is transported over the channel. In an effort to reduce the effects of dispersion, some systems predistort the signal in a manner that is intended to be 'complementary' to the effect of the channel, so that 'optimally' at the receiver the original signal, prior to the predistortion operation, may be recovered. Other systems attempt to ameliorate the problem by dealing directly with the channel itself, such as by using dispersion compensating fibers (DCFs). These approaches can be difficult or expensive to apply and, from a functional and architectural standpoint, are relatively rigid, so that they tend to be easily impacted by operational or environmental changes, such as mechanical vibration or variations in temperature.

Other approaches attempt to solve the problem at the receiver, such as through the use of some form of equalizer, which is operative to estimate the inverse effect of the channel on the signal, so that, ideally, the output of the equalizer is the original signal without the dispersive influence of the channel. Because the channels are subject to dynamic variation, the equalizer should be adaptive and, for this purpose, it is customary to initially train the equalizer prior to data transmission and then occasionally adjust the equalizer at prescribed intervals with a training sequence dedicated for the purpose. While this technique is effective at adapting the equalizer's coefficients and reducing channel-induced dispersion, it requires dedicated 'training sequence' communications between the transmitter and receiver, which inherently interrupts the transmission of user data, thereby reducing the effective user data rate.

SUMMARY OF THE INVENTION

In accordance with the present invention, problems of conventional methodologies for compensating channel dispersion in a high data rate optical communication system, such as those described above, are effectively obviated by means of an adaptive equalizer, weighting coefficients for which are updated by making use of a known signal pattern, such as, but not limited to, one or more frame synchronization patterns that are repetitively distributed among information signals contained within the electrical communication signals input to and output from the equalizer. Pursuant to a preferred, but non-limiting implementation, the adaptive equalizer coefficient update mechanism of the present invention is operative to extract the repetitive known, but distorted, signal pattern and then process the extracted pattern with an undistorted copy of that signal pattern that is synchronized with the extraction of the distorted version, so as to derive an error or differential signal through which weighting coefficients of the equalizer may be updated. The known signal pattern may comprise a frame synchronization pattern or a combination of frame synchronization patterns, distributed within the electrical communication signals input to and output from the equalizer. In accordance with an exemplary embodiment, known signals are identified using the output signal of the equalizer. It is to be understood, however, that the input signal to the equalizer may also be used.

As will be detailed in the example below, as uncompensated (channel-distorted) data is received it is modified 'equalized' by the adaptive equalizer and then coupled to each of a clock and data recovery unit, a frame sync correlator and sampling circuit. The weighting coefficients of the adaptive equalizer are initially set at prescribed values stored in a coefficient memory. Initial coefficient values are based upon a priori knowledge of the general characteristics of the channel when such knowledge is available. If a priori knowledge of the channel is not available, then initial coefficient values are specified in such a way as to cause the adaptive equalizer to have no effect on the received signal initially. Using initial coefficient values based on knowledge about the communication channel shortens initial coefficient convergence time and increases the probability that clock and frame synchronization signals will be detected accurately.

As the received data signal is processed by the adaptive equalizer and coupled to the correlator, it is compared against one or more frame synchronization patterns or templates. For an example embodiment using SONET STS-192, two basic frame synchronization patterns (or octets) labelled A1 and A2 consisting of eight bits each are defined by the protocol. Correlator templates may be formed out of one or more A1 or A2 synchronization patters or octets (for SONET STS-192, data streams contain 192 consecutive A1 octets and 192 consecutive A2 octets every 125 microseconds). In response to locating a frame synchronization pattern or template pattern in the received data stream, the frame sync correlator initiates a data transfer operation out of a sampling circuit's registers and out of a frame synchronization data store. Sampled equalizer input and output data are transferred to an associated data buffer. At the same time, corresponding but undistorted data is transferred from the frame synchronization data store to an associated data buffer.

With distorted framing pattern (or frame synchronization pattern) data and time-aligned, undistorted framing pattern data loaded into respective buffers, stored pattern data may be readily processed by a circuit, procedure or algorithm designed to update or adapt equalizer weighting coefficients according to some system optimizing criterion such as least mean squares (LMS), recursive least squares (RLS), or other mechanism. As a refinement to applying framing pattern data directly, the contents of the two buffers may be subjected to a prescribed synthesis operation, prior to submitting the signal streams to the coefficient update process, in order to improve the characteristics of the data relative to equalizer training (for example, it may be desirable to randomize or 'whiten' buffered pattern data before passing it on to the coefficient update process).

DESCRIPTION OF THE DRAWINGS

The single FIGURE diagrammatically illustrates a non-limiting implementation of a known embedded pattern-based adaptive equalizer updating mechanism of the present invention.

DETAILED DESCRIPTION

Figure 1:
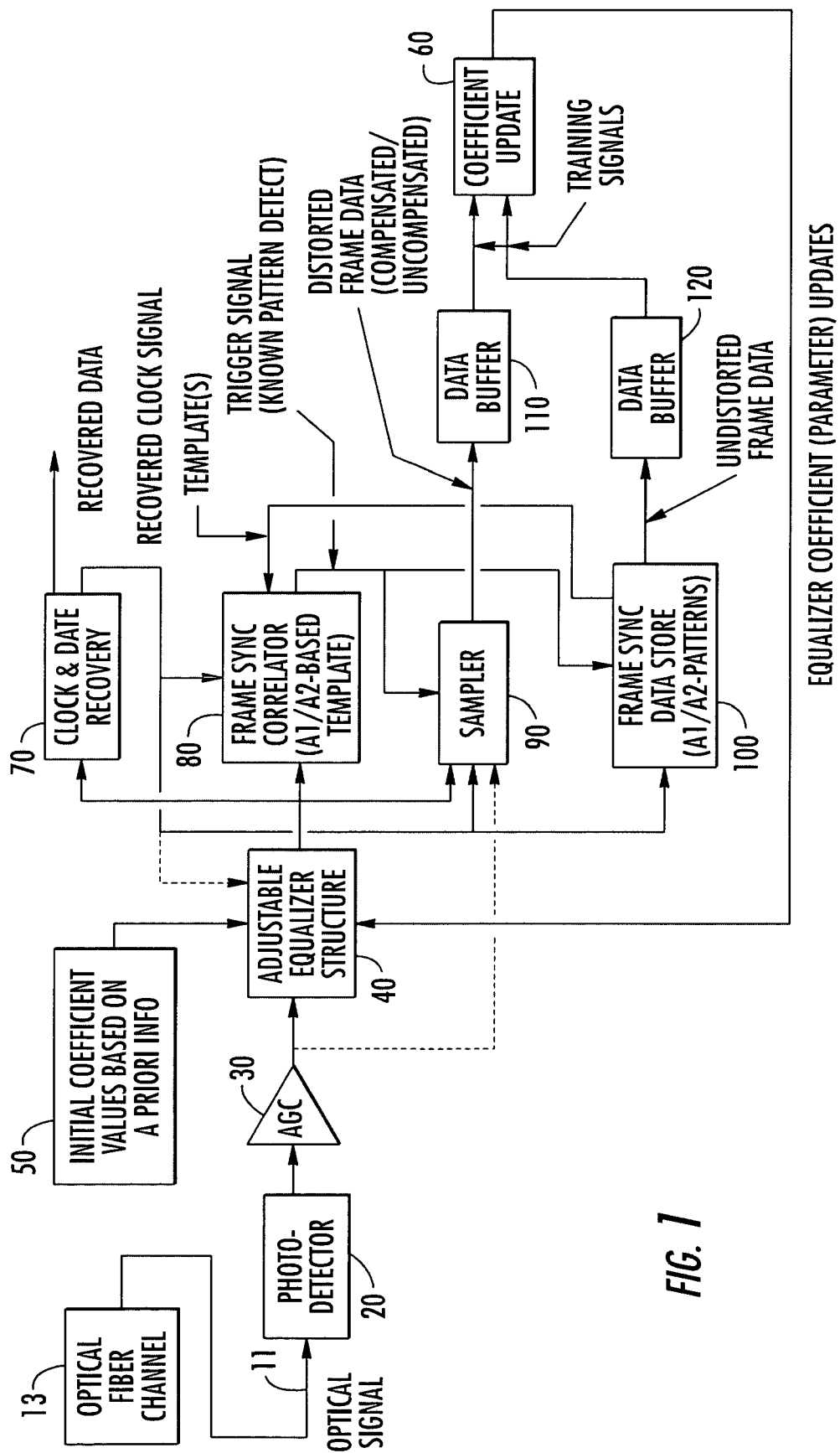

Before describing in detail the embedded pattern-based adaptive equalizer coefficient updating mechanism of the present invention, it should be observed that the invention resides primarily in prescribed modular arrangements of conventional digital communication circuits and associated digital signal processing components and attendant supervisory control circuitry therefor, that controls the operations of such circuits and components. In a practical implementation that facilitates their being packaged in a hardware-efficient equipment configuration, these modular arrangements may be readily implemented in different combinations of field programmable gate arrays (FPGAs), application specific integrated circuit (ASIC) chip sets, microwave monolithic integrated circuits (MIMICs), and digital signal processing (DSP) cores.

Consequently, the configuration of such arrangements of circuits and components and the manner in which they are interfaced with other communication equipment have been illustrated in the drawings by a readily understandable block diagram, which shows only those specific details that are pertinent to the present invention, so as not to obscure the disclosure with details which will be readily apparent to those skilled in the art having the benefit of the description herein. Thus, the block diagram illustration is primarily intended to show the major components of one embodiment of the invention in a convenient functional grouping, whereby the present invention may be more readily understood.

Attention is now directed to the single Figure, wherein a preferred, but non-limiting, embodiment of the present invention is diagrammatically illustrated as comprising an input port 11, to which an optical communication signal, such as that transported over a dispersive optical fiber 13, is coupled. For purposes of the present example, the optical communication channel may be understood to comprise a conventional synchronous optical network (SONET)-based optical communication signal, such as a SONET STS-192, which contains 192 consecutive bytes of A1 frame synchronization data and 192 consecutive bytes of A2 data in each 125-microsecond time interval.

The optical fiber 13 is coupled to input port 11 via a suitable optical coupler (not shown) to an opto-electronic receiver unit, such as a photodiode detector 20, which converts the received optical communication signal into an electrical communication signal. This electrical communication signal is representative of the optical signal and, as such, contains both the desired user information and framing components of the optical signal, as well as any distortion (e.g., dispersive distortion) that has been introduced into the optical signal as a result of its transport over the channel (fiber 13).

The output of photodiode 20 is coupled via an automatic gain control (AGC) circuit 30 to an input port 41 of a controllably adjustable (adaptive) equalizer 40. Equalizer 40 has its weighting coefficients initially set at prescribed values, such as those stored in an associated memory 50, and is coupled to be controllably updated in accordance with a set of updates provided by a coefficient update unit 60. Timing for the equalizer is derived from a clock and data recovery unit 70, which has its input coupled to the output of the equalizer. The prescribed coefficient values stored in memory 50 are based upon a priori knowledge of the general characteristics of the channel when such knowledge is available. If no such knowledge is available, then initial coefficient values are specified in such a way as to cause the adaptive equalizer to have no effect on the received signal initially. Using initial coefficient values based on knowledge about the communication channel shortens initial coefficient convergence time and increases the probability that the clock and data recovery unit 70 and the frame sync correlator 80 will detect clock and frame synchronization patterns accurately.

Equalizer 40 has its output further coupled to a frame synchronization correlator 80, which is operative to compare the signal stream produced by the equalizer with a copy of a frame synchronization pattern (or template) known a priori to be contained in that signal stream. As described briefly above, and in accordance with the present example, this template may be composed of 1 to 192 A1 frame synchronization octets or 1 to 192 A2 frame synchronization octets for SONET STS-192. Additionally, more than one template may be defined for the correlator. Correlator 80 is operative to continuously compare the incoming data stream with defined templates in order to locate where in the received data these known bit patterns occur. Sampling circuit 90 contains registers for both compensated and uncompensated sampled data. Once a known bit pattern has been detected, frame sync correlator 80 generates a trigger signal that initiates or enables the transfer of register contents in sampling circuit 90 to data buffer 110, and enables transfer of corresponding undistorted data stored in data store 100 to data buffer 120.

Sampling circuit 90 is coupled to sample the received data signal and equalizer 40 output signal and supply the sampled signals to an associated data buffer 110. The framing pattern data store (frame sync data store) 100 contains copies of one or more known signal patterns—with patterns being composed of one or more SONET A1 or A2 frame synchronization fields or octets, that are repetitively embedded in the received signal. In response to the trigger signal produced by the frame sync correlator 80, the framing pattern data store 100 transfers the data of a corresponding known and undistorted signal pattern into an associated buffer 120. Once distorted and undistorted pattern data has been captured in buffers 110 and 120, it may be processed by coefficient update unit 60 (using a differential optimization mechanism or algorithm, such as least mean squares (LMS), recursive least squares (RLS), or some other method) to produce a set of updates for the coefficients employed by the adaptive equalizer structure 40.

The adaptive equalizer update mechanism operates as follows. As uncompensated (channel-distorted) data is received it is modified by equalizer 40 and then coupled to each of the clock and data recovery unit 70, frame sync correlator 80 and sampling circuit 90. As pointed out above, the weighting coefficients of the adaptive equalizer 40 are initially set at prescribed values stored in coefficient memory 50. These values are based a priori knowledge of the general characteristics of the channel when such knowledge is available. If no such a prior knowledge is available, then initial coefficient values are specified in such a way as to cause the adaptive equalizer to have no effect on the received signal initially. Using initial coefficient values based on knowledge about the communication channel shortens initial coefficient convergence time and increases the probability that the clock and data recovery unit 70 and the frame sync correlator 80 will recover the clock signal and detect frame synchronization patterns correctly.

As the received data signal is coupled to correlator 80, it is correlated against (compared to) one or more signal patterns or templates known to occur in the data stream (in the present example, these patterns or templates are composed of a number of SONET A1 or A2 frame synchronization octets). In response to detecting a known signal pattern, frame sync correlator 80 generates a trigger signal that initiates a data transfer operation out of sampling circuit 90 registers and out of the framing pattern (frame sync) data store 100. Sampling circuit 90 therefore transfers sampled and distorted versions of the known SONET A1/A2-based pattern detected by frame sync correlator 80 to associated data buffer 110. At the same time, the framing pattern data store 100 outputs an undistorted version of the known SONET A1/A2-based pattern to data buffer 120.

As distorted known pattern data is stored in buffer 110 and time-aligned, undistorted pattern data is stored into buffer 120, it may be processed by coefficient update unit 60 (using a signal operator, method or algorithm, such as least means squares, recursive least squares, or other similar method designed to optimize some aspect of system performance), to produce sets of updates for the coefficients employed by the adaptive equalizer structure 40.

As will be appreciated from the foregoing description, problems of conventional methodologies for compensating channel dispersion in a high data rate optical communication system are effectively obviated by means of adaptive equalization and the embedded pattern-based adaptive equalizer coefficient updating mechanism of the present invention, which is operative to update the weighting coefficients of an adaptive equalizer in accordance with an error or differential signal obtained by processing the distorted version of a known signal pattern, that is repetitively distributed among information signals contained within the electrical communication signal output from the equalizer, with a copy of the known signal pattern. No dedicated 'training sequence' communication with the transmitter is required, so that the coefficient update mechanism does not impact the operation or bandwidth availability of the channel.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with a system for processing a communication signal, that has been transported over a dispersive communication channel, so as to recover an unknown information signal contained in said communication signal, wherein said communication signal is coupled to an adaptive equalizer to produce an output signal representative of said information signal, a method of updating weighting coefficients for said adaptive equalizer, said method comprising the steps of:

(a) processing an input signal to or said output signal produced by said adaptive equalizer to extract a distorted signal pattern signal representative of one or more known signal patterns repetitively distributed among information signals contained within said communication signal;

(b) processing an undistorted copy of said known signal patterns with said distorted signal pattern signal extracted in step (a) to derive an error or differential signal; and (c) updating said weighting coefficients for said equalizer in accordance with said error or differential signal derived in step (b) wherein step (a) comprises:

(a1) recovering a clock signal embedded within the output signal produced by said adaptive equalizer, (a2) correlating contents of said output signal with a copy of said known signal patterns in accordance with the clock signal recovered in step (a1) to identify where, within said output signal, said known signal patterns are located, (a3) sampling said output signal produced by said equalizer in accordance with locations of said known signal patterns identified in step (a2) and thereby extract said signal pattern signal.

2. The method according to claim 1, wherein step (b) comprises:

(b1) generating said undistorted copy of said known signal patterns in synchronization with the sampling of said output signal in step (a3), and (b2) processing said undistorted copy of said known signal patterns generated in step (b1) and said signal pattern signal extracted from said output signal in step (a3) to derive said error or differential signal.

3. The method according to claim 2, wherein step (b2) comprises subjecting said undistorted copy of said known signal patterns generated in step (b1) and said signal pattern signal extracted from said output signal in step (a3) to a prescribed synthesis operator to produce a synthesized version of said undistorted copy of said known signal patterns, and a synthesized version of said signal pattern signal extracted from said output signal, and combining said synthesized version of said undistorted copy of said known signal patterns and said synthesized version of said signal pattern signal extracted from said output signal to derive said error or differential signal.

4. A receiver apparatus for processing a communication signal, that has been transported over a dispersive communication channel, so as to recover an unknown information signal contained in said communication signal, comprising:

an adaptive equalizer coupled to receive said communication signal and being operative to produce an output signal representative of said information signal;

a pattern extractor which is operative to process one of an input signal to or said output signal produced by said adaptive equalizer to extract a distorted signal pattern signal representative of one or more known signal patterns repetitively distributed among information signals contained within said electrical communication signal;

a pattern signal processor which is operative to process an undistorted copy of said known signal patterns with said extracted distorted signal pattern signal to derive an error or differential signal; and a coefficient update unit that is operative to update said weighting coefficients of said equalizer in accordance with said error or differential signal, wherein said pattern extractor includes a clock recovery unit which is operative to recover a clock signal embedded within the output signal produced by said adaptive equalizer, a correlator which is operative to correlate contents of said output signal with a copy of said known signal patterns in accordance with the clock signal, to identify where, within said output signal, said known signal patterns are located, and a sampler, which is operative to sample said output signal produced by said equalizer in accordance with locations of said known signal patterns identified by said correlator and thereby extract said signal pattern signal.

5. The receiver apparatus according to claim 4, wherein said pattern signal processor is operative to generate said undistorted copy of said known signal patterns in synchronization with the sampling of said output signal and to process said undistorted copy of said known signal patterns and said signal pattern signal extracted from said output signal to derive said error or differential signal.

6. The receiver apparatus according to claim 5, wherein said pattern signal processor is operative to subject said undistorted copy of said known signal patterns and said signal pattern signal extracted from said output signal to a prescribed synthesis operator to produce a synthesized version of said undistorted copy of said known signal patterns, and a synthesized version of said signal pattern signal extracted from said output signal, and to combine said synthesized version of said undistorted copy of said known signal patterns and said synthesized version of said signal pattern signal extracted from said output signal to derive said error or differential signal.

7. A method for processing a communication signal, that has been transported over a dispersive communication channel, so as to recover an unknown information signal contained in said communication signal, comprising the steps of:

coupling said communication signal to an adaptive equalizer which is operative to produce an output signal representative of said information signal;

processing one of an input signal to or said output signal produced by said adaptive equalizer to extract a distorted signal pattern signal representative of one or more known signal patterns repetitively distributed among information signals contained within said electrical communication signal;

processing an undistorted copy of said known signal patterns with said extracted distorted signal pattern signal to derive an error or differential signal; and updating said weighting coefficients of said equalizer in accordance with said error or differential signal, wherein extraction of said pattern is accomplished by recovering a clock signal embedded within the output signal produced by said adaptive equalizer, correlating contents of said output signal with a copy of said known signal patterns in accordance with the clock signal, to identify where, within said output signal, said known signal patterns are located, and sampling said output signal produced by said equalizer in accordance with identified locations of said known signal patterns to thereby extract said signal pattern signal.

8. The method according to claim 7, wherein processing of said pattern includes generating said undistorted copy of said known signal patterns in synchronization with sampling of said output signal and processing said undistorted copy of said known signal patterns and said signal pattern signal extracted from said output signal to derive said error or differential signal.

9. The method according to claim 8, wherein said undistorted copy of said known signal patterns and said signal pattern signal extracted from said output signal are subjected to a prescribed synthesis operator to produce a synthesized version of said undistorted copy of said known signal patterns, and a synthesized version of said signal pattern signal extracted from said output signal, and wherein said synthesized version of said undistorted copy of said known signal patterns and said synthesized version of said signal pattern signal extracted from said output signal are differentially combined to derive said error or differential signal.

* * * * *